United States Patent [19]

Okada

[11] Patent Number: 4,803,235

[45] Date of Patent: Feb. 7, 1989

[54] COMPOSITION FOR INJECTION MOLDING

[75] Inventor: Tsuneyoshi Okada, Kawasaki, Japan

[73] Assignee: PolyPlastics Co., Ltd., Osaka, Japan

[21] Appl. No.: 108,997

[22] Filed: Oct. 16, 1987

[30] Foreign Application Priority Data

Oct. 17, 1986 [JP] Japan ................. 61-247097

[51] Int. Cl.$^4$ ............................ C08K 7/14; C08K 7/06
[52] U.S. Cl. ..................................... 524/494; 524/496; 524/602; 524/605
[58] Field of Search ................ 524/494, 496, 605, 602

[56] References Cited

U.S. PATENT DOCUMENTS 4,431,770 2/1984 East et al. .............................. 524/605
4,434,262 2/1984 Buckley et al. ....................... 524/605

Primary Examiner—Lewis T. Jacobs
Attorney, Agent, or Firm—Birch, Stewart, Kolasch & Birch

[57] ABSTRACT

A resin composition is suitable for injection moulding and comprises 40 to 80 percent by weight of a thermotropic, liquid crystalline polyester being capable of forming the an anisotropic phase in the molten state and having a weight-average molecular weight of 2,000 to 200,000 and 20 to 60 percent by weight of a fibrous material having a tensile modulus of not less than 6,000 kg/mm2, a weight-average length of 0.15 to 0.60 mm and an aspect ratio of not less than 10.

6 Claims, 1 Drawing Sheet

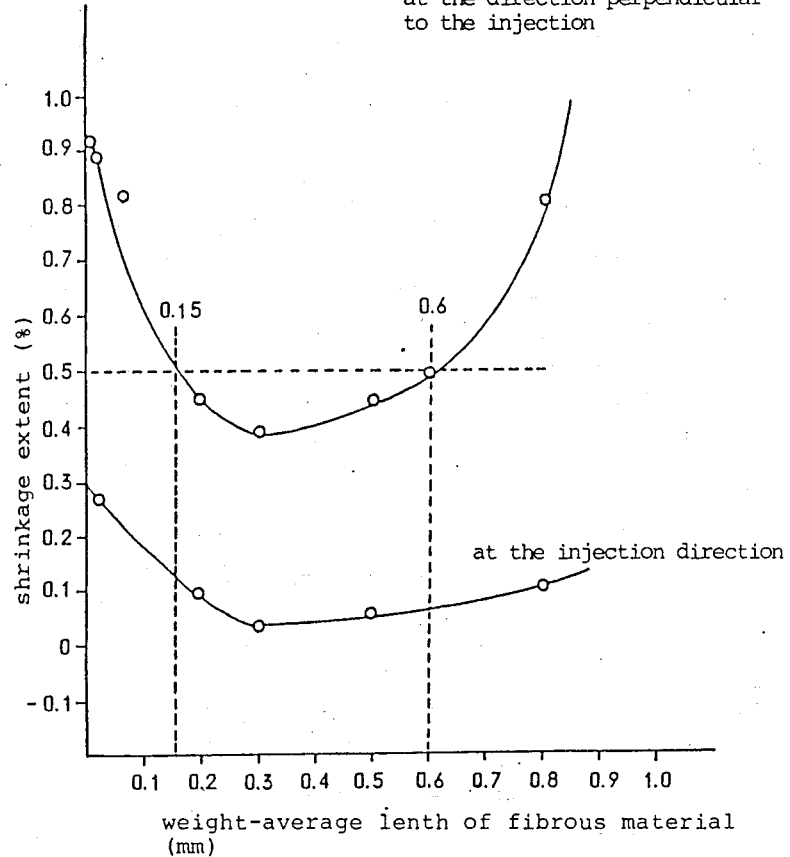

COMPOSITION FOR INJECTION MOLDING

BACKGROUND OF THE INVENTION

Field of the Invention

The present invention relates to a composition for precision injection molding which permits an accurate transfer of the mold dimensions and configuration.

[Discussion of Related Art]

With the recent advent of engineering plastics, the shortcoming of plastics in that the strength of plastics being lower than that of metals has been overcome to a great extent, and metals are being replaced by plastics in many areas. A disadvantage of engineering plastics is that these plastics are are mostly comprised of crystalline polymers and hence they have a high molding shrinkage. To cope with this problem, great efforts are being devoted to the mold design. A crystalline polymer having an orderly molecular orientation is desirable for high strength; but such a polymer has an inherent disadvantage in that it undergoes a greater volume change when it melts and solidifies than non-crystalline polymers.

However, the situation has drastically changed since the recent development of thermotropic liquid crystalline polyester which exhibits anisotropism in its molten state (referred to as liquid crystalline polyester hereinafter). This liquid crystalline polyester melts while maintaining the crystalline structure. Therefore, it undergoes only a small volume change when it melts and solidifies (which leads to a small molding shrinkage) and yet it provides injection-molded articles having a high stength which is attributable to the crystalline structure. In contrast with this advantage, the liquid crystalline polyester has a shortcoming in that the molding shrinkage greatly differs depending on the direction with respect to the resin flow in the molding process, although the absolute value of the molding shrinkage is small. Thus it is difficult to produce precision moldings from a liquid crystalline polyester.

To solve this problem, the present inventors carried out extensive studies and completed the present invention.

SUMMARY OF THE INVENTION

A resin composition according to the present invention is suitable for injection moulding and comprises 40 to 80 percent by weight of a thermotropic, liquid crystalline polyester being capable of forming an anisotropic phase in the molten state and state and having a weight-average molecular weight of 2,000 to 200,000 and 20 to 60 percent by weight of a fibrous material having a tensile modulus of not less than 6,000 kg/mm2, a weight-average length of 0.15 to 0.60 mm and an aspect ratio of not less than 10.

It is preferable that the resin composition comprises 50 to 75 wt.% of the polyester and 25 to 50 wt.% of the fibrous material. The polyester is preferably an aromatic polyester.

DETAILED DESCRIPTION OF THE INVENTION

The liquid-crystalline polyester used in the present invention is a melt-processable polyester having such characteristic properties that the polymer molecule chains are regularly oriented parallel to one another in the molten state. The state in which the molecules are oriented in this manner is referred to as the liquid-crystal state or the nematic phase of the liquid crystal substance. A polymer of this type is composed of monomers which are long and narrow, flat, and rigid along the long axis of the molecule and have a plurality of chain extension bonds coaxial or parallel to one another.

The properties of the anisotropic molten phase can be determined by an ordinary polarization test using crossed nicols. More particularly, the properties can be determined with a Leitz polarizing microscope of 40 magnifications by observing a sample placed on a Leitz hot stage in a nitrogen atmosphere. The polymer is optically anistropic. Namely, it transmits a light when it is placed in between the crossed nicols. When the sample is optically anisotropic, the polarized light can be transmitted through it even in a still state.

The constituents of the polymer forming the above-mentioned anisotropic molten phase are as follows:

(1) one or more of aromatic and alicyclic dicarboxylic acids, (2) one or more of aromatic, alicyclic, and aliphatic diols, (3) one or more of aromatic hydroxycarboxylic acids, (4) one or more of aromatic thiolcarboxylic acids, (5) one or more of aromatic dithiols and aromatic thiolphenols, and (6) one or more of aromatic hydroxyamines and aromatic diamines.

The polymers forming the anisotropic molten phase comprise the following combinations:

(I) a polyester comprising (1) and (2),
(II) a polyester comprising only (3),
(III) a polyester comprising (1), (2), and (3),
(IV) a polythiol ester comprising only (4),
(V) a polythiol ester comprising (1) and (5),
(VI) a polythiol ester comprising (1), (4), and (5),
(VII) a polyester amide comprising (1), (3), and (6), and
(VIII) a polyesteramide comprising (1), (2), (3), and (6).

In addition to the above-mentioned combinations of the components, the polymers forming the anisotropic molten phase include also aromatic polyazomethines such as poly(nitrilo-2-methyl-1,4-phenylenenitriloethylidine-1,4-phenylenethylidine), poly(nitrilo-2-methyl-1,4-phenylenenitrilomethylidine-1,4-phenylenemethylidine) and poly(nitrilo-2-chloro-1,4-phenylenenitrilomethylidine-1,4-phenylenemethylidine).

Further, in addition to the above-mentioned combinations of the components, the polymers forming the anisotropic molten phase include polyester carbonates essentially comprising 4-hydroxybenzoyl, dihydroxyphenyl, dihydroxycarbonyl, and terephthaloyl units.

Examples of the compounds constituting the above-mentioned polymers (I) to (VIII) include aromatic dicarboxylic acids such as terephthalic acid, 4,4'-diphenyldicarboxylic acid, 4,4'-triphenyldicarboxylic acid, 2,6-naphthalenedicarboxylic acid, diphenyl ether-4,4'-dicarboxylic acid, diphenoxyethane-4,4'-dicarboxylic acid, diphenoxybutane-4,4'-dicarboxylic acid, diphenylethane-4,4'-dicarboxylic acid, isophthalic acid, diphenyl ether-3,3'-dicarboxylic acid, diphenoxyethane-3,3'-dicarboxylic acid, diphenylethane-3,3'-dicarboxylic acid, and naphthalene-1,6-dicarboxylic acid; and those substituted with alkyl and alkoxy groups and halogen atoms, such as chloroterephthalic acid, dichloroterephthalic acid, bromoterephthalic acid, methylterephthalic acid, dimethylterephthalic acid, ethylterephthalic acid, methoxyterephthalic acid, and ethoxyterephthalic acid.

Examples of the alicyclic dicarboxylic acids include trans-1,4-cyclohexanedicarboxylic acid, cis-1,4-cyclohexanedicarboxylic acid, and 1,3-cyclohexanedicarboxylic acid as well as those substituted with alkyl and alkoxy groups and halogen atoms, such as trans-1,4-(1-methyl)cyclohexane dicarboxylic acid and trans-1,4-(1-chloro)cyclohexanedicarboxylic acid.

Examples of the aromatic diols include hydroquinone, resorcinol, 4,4'-dihydroxydiphenyl, 4,4'-dihydroxytriphenyl, 2,6-naphthalenediol, 4,4'-dihydroxydiphenyl ether, bis-(4-hydroxyphenoxy)ethane, 3,3'-dihydroxydiphenyl, 3,3'-dihydroxydiphenyl ether, 1,6-naphthalenediol, 2,2-bis(4-hydroxyphenyl)propane, and 2,2-bis(4-hydroxyphenyl)methane as well as those substituted with alkyl and alkoxy groups and halogen atoms, such as chlorohydroquinone, methylhydroquinone, 1-butylhydroquinone, phenylhydroquinone, methoxyhydroquinone, 1-butylhydroquinone, phenylhydroquinone, methoxyhydroquinone, phenoxyhydroquinone, 4-chlororesorcinol, and 4-methylresorcinol.

Examples of the alicyclic diols include trans-1,4-cyclohexanediol, cis-1,4-cyclohexanediol, trans-1,4-cyclohexanedimethanol, cis-1,4-cyclohexanedimethanol, trans-1,3-cyclohexanediol, cis-1,2-cyclohexanediol, and trans-1,3-cyclohexanedimethanol as well as those substituted with alkyl and alkoxy groups and halogen atoms, such as trans-1,4-(1-methyl)cyclohexanediol and trans-1,4-(1-chloro)cyclohexanediol.

Examples of the aliphatic diols include straight-chain or branched-chain aliphatic diols such as ethylene glycol, 1,3-propanediol, 1,4-butanediol, and neopentyl glycol.

Examples of the aromatic hydroxycarboxylic acids include 4-hydroxybenzoic acid, 3-hydroxybenzoic acid, 6-hydroxy-2-naphthoic acid, and 6-hydroxy-1-naphthoic acid as well as those substituted with alkyl and alkoxy groups and halogen atoms, such as 3-methyl-4-hydroxybenzoic acid, 3,5-dimethyl-4-hydroxybenzoic acid, 2,6-dimethyl-4-hydroxybenzoic acid, 3-methoxy-4-hydroxybenzoic acid, 3,5-dimethoxy-4-hydroxybenzoic acid, 6-hydroxy-5-methyl-2-naphthoic acid, 6-hydroxy-5-methoxy-2-naphthoic acid, 3-chloro-4-hydroxybenzoic acid, 2-chloro-4-hydroxy-benzoic acid, 2,3-dichloro-4-hydroxybenzoic acid, 3,5-dichloro-4-hydroxybenzoic acid, 2,5-dichloro-4-hydroxybenzoic acid, 3-bromo-4-hydroxybenzoic acid, 6-hydroxy-5-chloro-2-naphthoic acid, 6-hydroxy-7-chloro-2-naphthoic acid, and 6-hydroxy-5,7-dichloro-2-naphthoic acid.

Examples of the aromatic mercaptocarboxylic acids include 4-mercaptobenzoic acid, 3-mercaptobenzoic acid, 6-mercapto-2-naphthoic acid, and 7-mercapto-2-naphthoic acid.

Examples of the aromatic dithiols include benzene-1,4-dithiol, benzene-1,3-dithiol, 2,6-naphthalenedithiol, and 2,7-naphthalenedithiol.

Examples of the aromatic mercaptophenols include 4-mercaptophenol, 3-mercaptophenol, 6-mercaptophenol, and 7-mercaptophenol.

Examples of the aromatic hydroxyamines and aromatic diamines include 4-aminophenol, N-methyl-4-aminophenol, 1,4-phenylenediamine, N-methyl-1,4-phenylenediamine, N,N'-dimethyl-1,4-phenylenediamine, 3-aminophenol, 3-methyl-4-aminophenol, 2-chloro-4-aminophenol, 4-amino-1-naphthol, 4-amino-4'-hydroxydiphenyl, 4-amino-4'-hydroxydiphenyl ether, 4-amino-4'-hydroxyphenylmethane, 4-amino-4'-hydroxydiphenyl sulfide, 4,4'-diaminophenyl sulfide (thiodianiline), 4,4'-diaminodiphenyl sulfone, 2,5-diaminotoluene, 4,4'-ethylenedianiline, 4,4'-diaminodiphenoxyethane, 4,4'-diaminodiphenylmethane (methylenedianiline), and 4,4'-diaminodiphenyl ether (oxydianiline).

The polymers (I) to (VIII) comprising the above-mentioned components may be divided into a group of those capable of forming the anisotropic molten phase and a group of those incapable of forming said phase according to the constituents, polymers composition, and sequence distribution. The polymers used in the present invention are limited to those of the former group.

Among the polymers capable of forming the anisotropic molten phase suitably used in the present invention, the polyesters (I), (II), and (III), and polyesteramides (VIII) can be prepared by various ester forming processes wherein organic monomers each having a functional group which can form a desired recurring unit by the condensation are reacted with each other. The functional groups of these organic monomers include carboxyl, hydroxyl, ester, acryloxy, acyl halide, and amine groups. These organic monomers can be reacted by melt acidolysis in the absence of any heat exchange fluid. In this process, the monomers are heated to form a melt. As the reaction proceeds, the solid polymer particles are suspended in the melt. In the final stage of the condensation reaction, the reaction system may be evacuated to facilitate the removal of volatile by-products (e.g., acetic acid and water).

A slurry polymerization process may also be employed in the preparation of fully aromatic polyesters suitable for use in the present invention. In this process, the solid product is obtained in the form of suspension thereof in a heat exchange medium.

In either of said melt acidolysis and slurry polymerization processes, organic monomeric reactants from which fully aromatic polyesters can be derived may be employed in the reaction in a modified form obtained by esterifying the hydroxyl group of the monomer at ambient temperature (i.e., in the form of their lower acyl esters). The lower acyl groups have preferably about 2 to 4 carbon atoms. Preferably, acetates of the organic, monomeric reactants are employed in the reaction.

Typical examples of the catalysts usable in both of the melt acidolysis and slurry processes include dialkyltin oxides (such as dibutyltin oxide), diaryltin oxide, titanium dioxide, antimony trioxide, alkoxytitanium silicates, titanium alkoxides, alkali metal and alkaline earth metal salts of carboxylic acids (such as zinc acetate), Lewis acids (such as $BF_3$), and gaseous acid catalysts such as hydrogen halides (e.g., HCl). The catalyst is used in an amount of about 0.001–1 wt%, particularly about 0.01–0.2 wt%, based on the total weight of the monomer.

The fully aromatic polymers suitable for use in the present invention are substantially insoluble in ordinary solvents and, therefore, they are unsuitable for use by solution processing. However, as described above, these polymes can be processed easily by an ordinary melt processing process. Particularly preferred fully aromatic polymers are soluble in pentafluorophenol to some extent.

The fully aromatic polyester preferably used in the present invention have a weight-average molecular weight of generally about 2,000–200,000, preferably about 10,000–50,000, particularly about 20,000–25,000.

The fully aromatic polyesteramides preferably used have a molecular weight of generally about 5,000-50,000, preferably about 10,000-30,000, for example, 15,000-17,000. The molecular weight may be determined by gel permeation chromatography or other standard methods in which no polymer solution is formed, such as a method in which terminal groups of a compression-molded film are determined by infrared spectroscopy. In another method, the molecular weight of the polymer may be determined according to a light-scattering method after it is dissolved in pentafluorophenol.

When the fully aromatic polyester or polyesteramide is dissolved in pentafluorophenol at 60° C. to obtain a 0.1 wt% solution thereof, the solution has generally an inherent viscosity (I.V.) of at least about 2.0 dl/g, for example, about 2.0-10.0 dl/g.

The anisotropic molten phase-forming polyesters used in the present invention should preferably be aromatic polyesters and aromatic polyester amides. Other preferred examples include those polyesters containing aromatic polyester and aromatic polyesteramide in the same molecular chain.

They are constructed of those compounds which are exemplified by naphthalene compounds such as 2,6-naphthalene dicarboxylic acid, 2,6dihydroxynaphthalene, 1,4-dihydoxyhaphthalene, and 6-hydroxy-2-naphthoic acid; biphenyl compounds such as 4,4'-diphenyldicarboxylic acid and 4,4'-dihydroxybiphenyl; compounds represented by the following formula (I), (II), or (III).

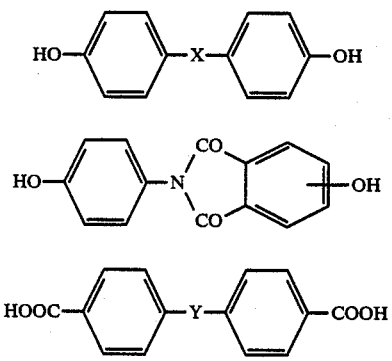

(where X is a group selected from $C_1$-$C_4$ alkylene, alkylidene, —O—, —SO—, —SO$_2$—, —S—, and —CO—, and Y is a group selected from —(CH$_2$)$_n$— (n=1-4) and —O(CH$_2$)$_n$O— (n=1-4).);

para-substituted benzene compounds such as p-hydroxybenzoic acid, terephthalic acid, hydroquinone, p-aminophenol, and p-phenylenediamine, and nucleus-substituted benzene compounds (the substituent group being selected from chlorine, bromine, methyl, phenyl, and 1-phenylethyl); and meta-substituted benzene compounds such as isophthalic acid and resorcinol.

Preferred examples of polyesters partially containing the abovementioned constituents in the same molecular chain include polyalkylene terephthalate, with the alkyl group containing 2-4 carbon atoms.

Those polyesters containing as the essential constituents one or more than one kind of the above-mentioned naphthalene compounds, biphenyl compounds, para-substituted benzene compounds are particularly preferable. Among the para-substituted benzene compounds, p-hydroxybenzoic acid, methyl hydroquinone, and 1-phenylethylhydroquinone are particularly preferable.

The combination of the constituents are exemplified as follows:

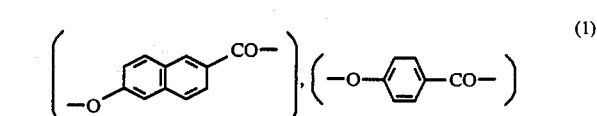

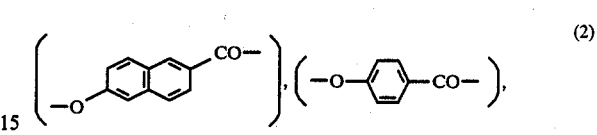

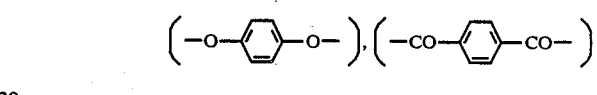

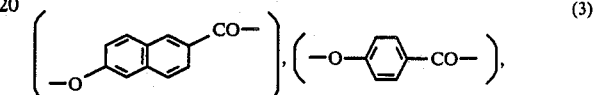

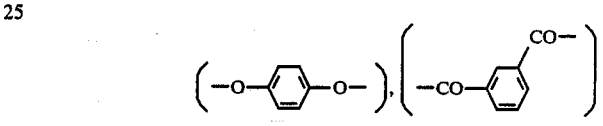

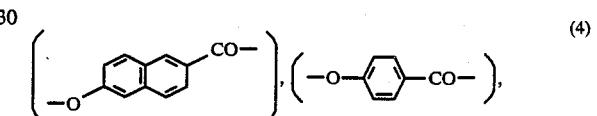

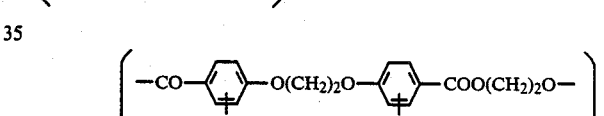

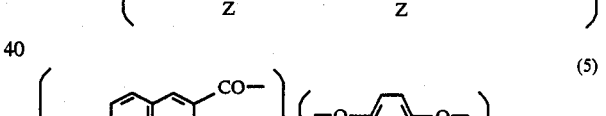

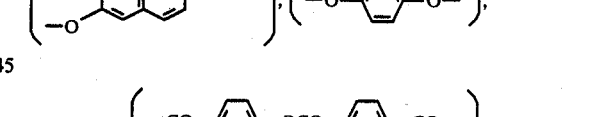

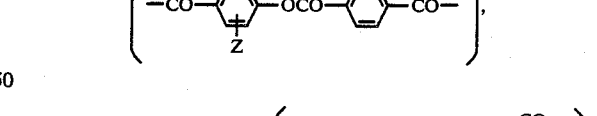

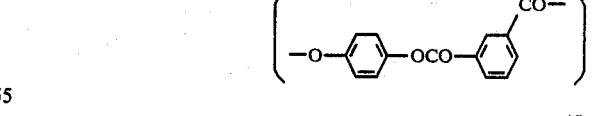

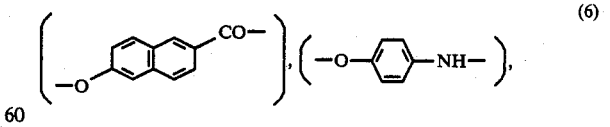

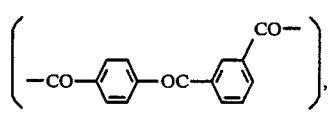
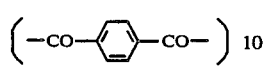 (8)
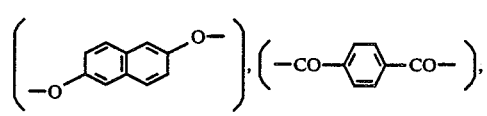
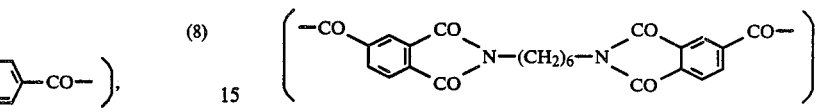 (13)
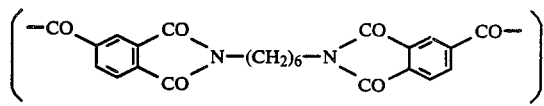 (9)
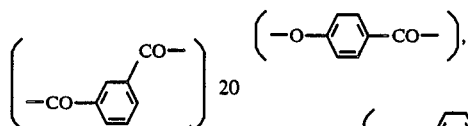 (14)
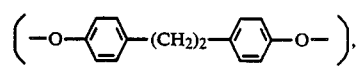
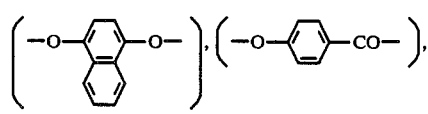 (10)
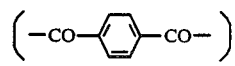 (15)
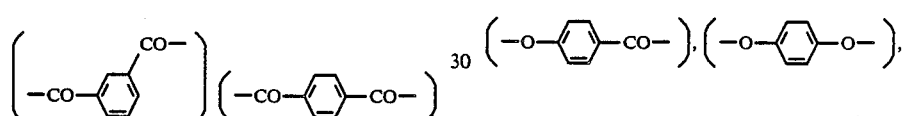
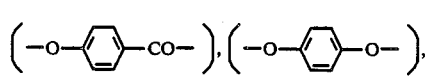 (11)
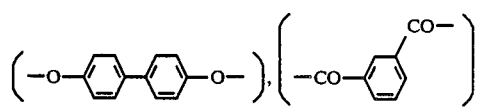 (16)
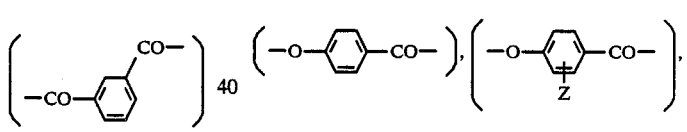
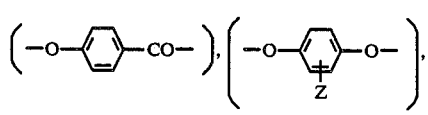 (12)
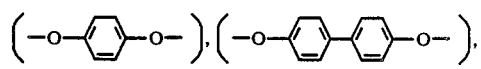 (17)
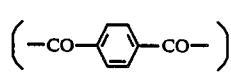
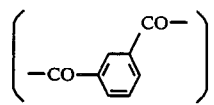
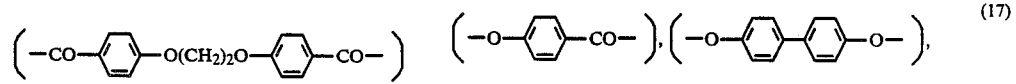
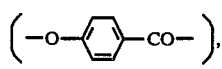
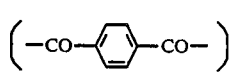 (18)
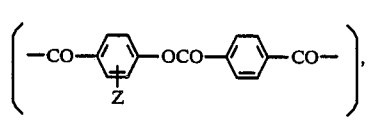
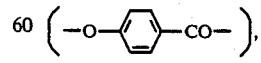
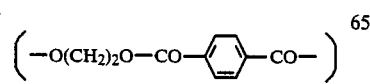
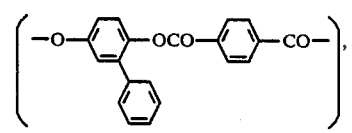

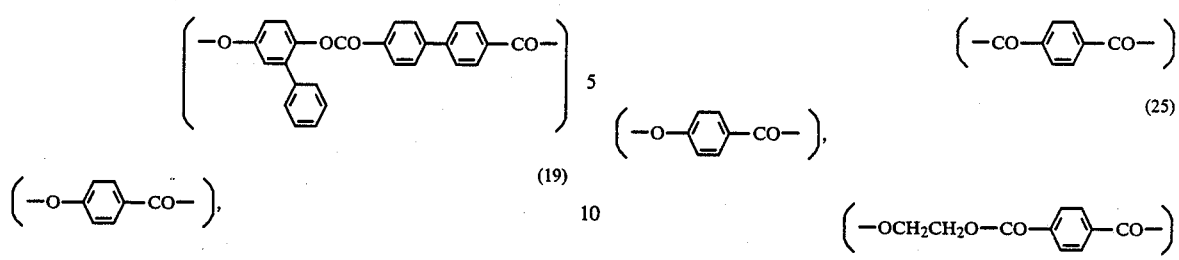
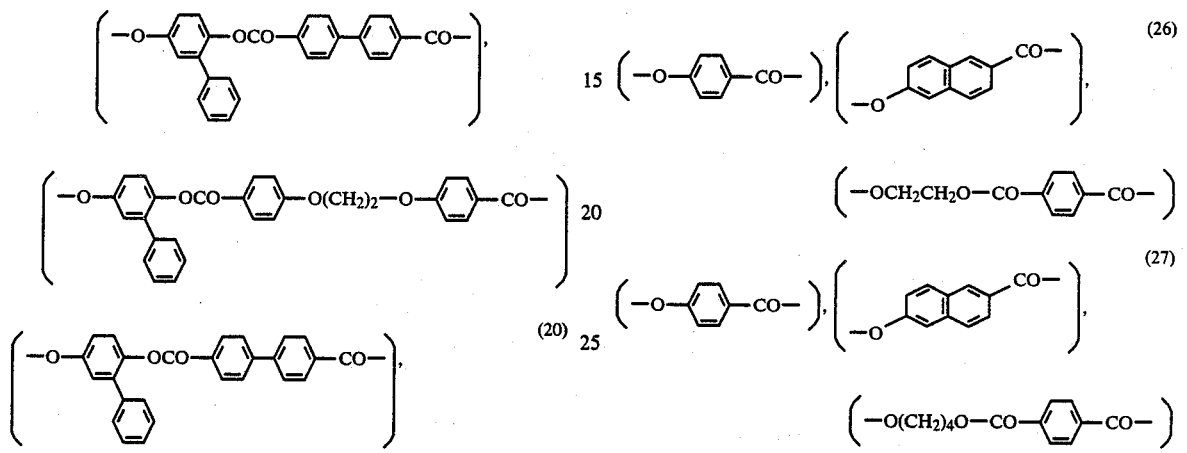
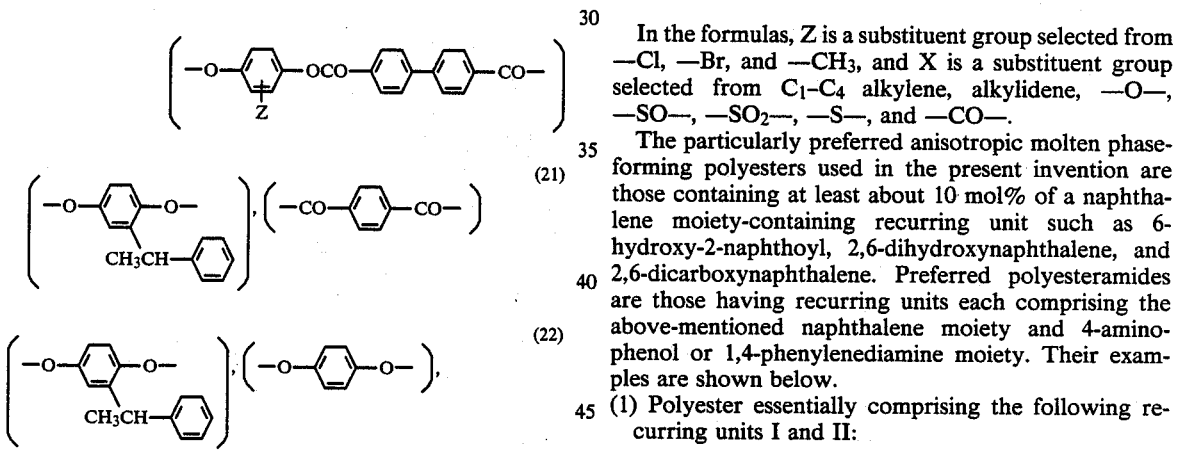
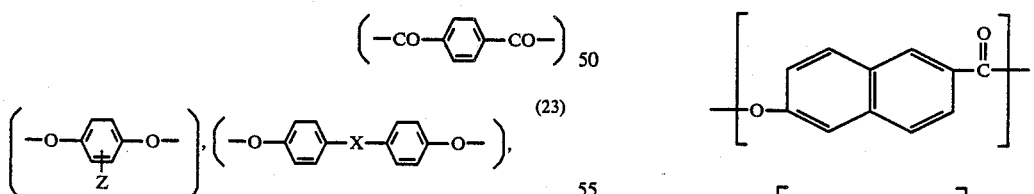
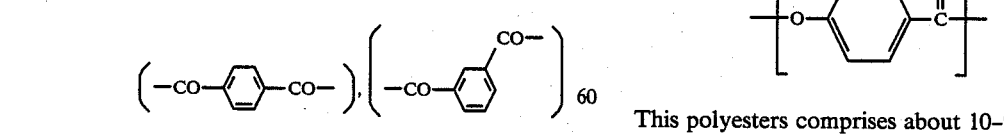

In the formulas, Z is a substituent group selected from —Cl, —Br, and —CH₃, and X is a substituent group selected from C₁–C₄ alkylene, alkylidene, —O—, —SO—, —SO₂—, —S—, and —CO—.

The particularly preferred anisotropic molten phase-forming polyesters used in the present invention are those containing at least about 10 mol% of a naphthalene moiety-containing recurring unit such as 6-hydroxy-2-naphthoyl, 2,6-dihydroxynaphthalene, and 2,6-dicarboxynaphthalene. Preferred polyesteramides are those having recurring units each comprising the above-mentioned naphthalene moiety and 4-aminophenol or 1,4-phenylenediamine moiety. Their examples are shown below.

(1) Polyester essentially comprising the following recurring units I and II:

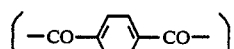
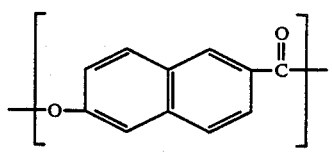
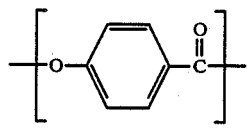

This polyesters comprises about 10–90 mol% of unit I and about 10–90 mol% of unit II. In one embodiment, the amount of unit I is about 65–85 mol%, preferably about 70–80 mol% (for example, about 75 mol%). In another embodiment, the amount of unit II is about 15–35 mol%, preferably about 20–30 mol%. At least a portion of the hydrogen atoms attaching directly to the ring may be replaced with a substituent group selected from the group consisting of alkyl groups having 1–4 carbon atoms, alkoxy groups having 1–4 carbon atoms, halogen atoms, a phenyl group, substituted phenyl groups, and combinations thereof.

(2) Polyester essentially comprising the following recurring units I, II, and III:

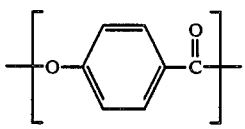
I

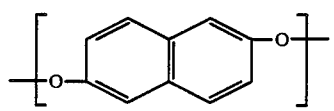
II

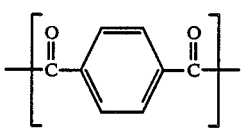
III

This polyester contains about 30–70% of unit I. It comprises preferably about 40–60 mol% of unit I, about 20–30 mol% of unit II, and about 20–30 mol% of unit III. At least a portion of the hydrogen atoms attaching directly to the ring may be replaced with a substituent group selected from the group consisting of alkyl groups having 1–4 carbon atoms, alkoxy groups having 1–4 carbon atoms, halogen atoms, a phenyl group, substituted phenyl groups, and combinations thereof.

(3) Polyester essentially comprising the following recurring units I, II, III, and IV.

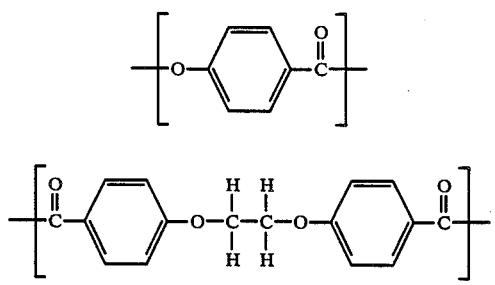
I

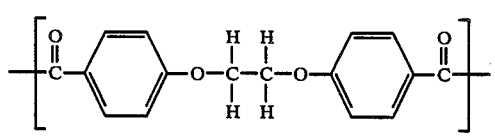
II

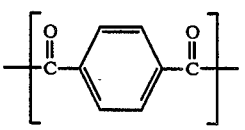
III

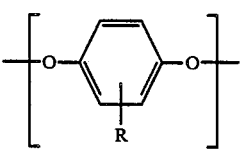
IV (wherein R represents a substituent for the hydrogen atom on the aromatic ring which is methyl, chlorine, bromine, or a combination thereof). This polyester contains about 20–60 mol% of unit I, about 5–18 mol% of unit II, about 5–35 mol% of unit III, and about 20–40 mol% of unit IV. Preferably, it comprises about 35–45 mol% of unit I, about 10–15 mol% of unit II, about 15–25 mol% of unit III, and about 25–35 mol% of unit IV, provided that the total molar concentration of units II and III is substantially equal to that of unit IV. At least a portion of the hydrogen atoms attaching directly to the ring may be replaced with a substituent group selected from the group consisting of alkyl groups having 1–4 carbon atoms, alkoxy groups having 1–4 carbon atoms, halogen atoms, a phenyl group, substituted phenyl groups, and a combination thereof. When the fully aromatic polyester is dissolved in pentafluorophenol at 60° C. to obtain a 0.3 w/v% solution thereof, the solution has generally an inherent viscosity of at least 2.0 dl/g, for example, 2.0–10.0 dl/g.

(4) Polyester essentially comprising the following recurring units I, II, III, and IV:

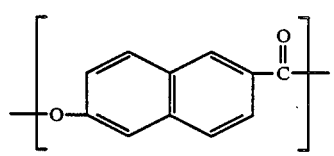
I

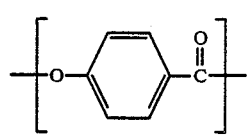
II

III dioxyaryl unit of the general formula: $+O-Ar-O+$ wherein Ar represents a divalent group having at least one aromatic ring, IV dicarboxylic unit of the general formula:

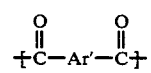

wherein Ar' represents a divalent group having at least one aromatic ring.

The amount of unit I is about 20–40 mol%. The amount of unit II is in excess of 10 mol% but up to about 50 mol%. The amount of unit III is in excess of 5 mol% but up to about 30 mol% and the amount of unit IV is in excess of 5 mol% but up to 30 mol%. This polyester comprises preferably about 20–30 mol% (for example, about 25 mol%) of unit I, about 25–40 mol% (for example, about 35 mol%) of unit II, about 15–25 mol% (for example, about 20 mol%) of unit III and about 15–25 mol% (for example, about 20 mol%) of unit IV. If necessary, at least a portion of the hydrogen atoms attaching directly to the ring may be replaced with a substituent group selected from the group consisting of alkyl groups having 1–4 carbon atoms, alkoxy groups having 1–4 carbon atoms, halogen atoms, a phenyl group, substituted phenyl groups, and a combination thereof.

The units III and IV should preferably be symmetrical in the sense that the divalent bonds connecting them to adjacent units (on both sides) are arranged symmetrically on one or more aromatic rings (for example, when they are on a naphthalene ring, they are arranged in positions para to each other or a diagonal rings). However, asymmetrical units derived from resorcinol and isophthalic acid may also be used.

A preferred dioxyaryl unit III is as follows:

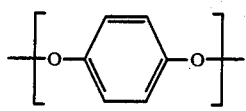

and a preferred dicarboxyaryl unit IV is as follows:

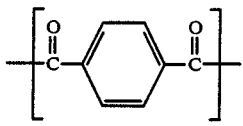

(5) Polyester essentially comprising the following recurring units I, II, and III:

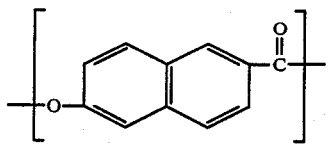

II. dioxyaryl unit of the general formula: -(-O—Ar—O-)- wherein Ar represents a divalent group having at least one aromatic ring, III. dicarboxyaryl unit of the general formula:

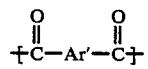

wherein Ar' represents a divalent group having at least one aromatic ring.

The amounts of units I, II, and III are about 10-90 mol%, 5 to 45 mol%, 5-45 mol%, and 5-45 mol%, respectively. This polyester comprises preferably about 20-80 mol% of unit I, about 10-40 mol% of unit II, and about 10-40 mol% of unit III. More preferably, it comprises about 60-80 mol% of unit I, about 10-20 mol% of unit II, and about 10-20 mol% of unit III. If necessary, at least a portion of the hydrogen atoms attaching directly to the ring may be replaced with a substituent group selected from the group consisting of alkyl group having 1-4 carbon atoms, alkoxy group having 1-4 carbon atoms, halogen atom, phenyl group, substituted phenyl group, and a combination thereof.

A preferred dioxyaryl unit II is as follows:

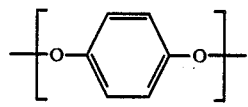

and a preferred dicarboxyaryl unit III is as follows:

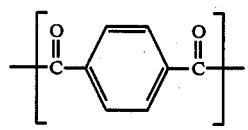

(6) Polyesteramide essentially comprising the following recurring units I, II, III, and IV:

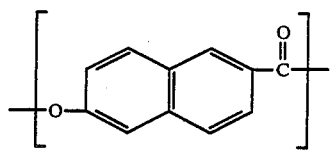

II. a unit of the general formula:

wherein A represents a divalent group having at least one aromatic ring or a divalent trans-cyclohexane group, III. a unit of the general formula: —Y—Ar—Z— wherein Ar represents a divalent group having at least one aromatic ring, Y represent O, NH or NR, and Z represents NH or NR, R being an alkyl group having 1-6 carbon atoms or an aryl group, IV. a unit of the general formula: -(-O—Ar'—O-)- wherein Ar' represents a divalent group having at least one aromatic ring.

The amounts of units I, II, III, and IV are about 10-90 mol%, about 5-45 mol%, about 5-45 mol%, and about 0-40 mol%, respectively. If necessary, at least a portion of the hydrogen atoms attaching directly to the ring may be replaced with a substituent group selected from the group consisting of alkyl group having 1-4 carbon atoms, alkoxy group having 1-4 carbon atoms, halogen atom, phenyl group, substituted phenyl group, and a combination thereof.

A preferred dicarboxyaryl unit II is as follows:

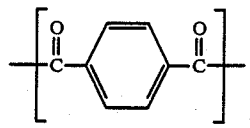

a preferred unit III is as follows:

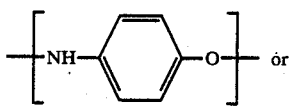 or

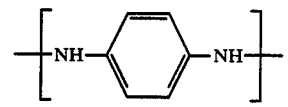

and a preferred dioxyaryl unit IV is as follows:

The anisotropic molten phase-forming polymers of the present invention include also those wherein part of a polymer chain comprises a segment of the above-mentioned anisotropic molten phase-forming polymer and the balance comprises a segment of a thermoplastic resin which does not form an anisotropic molten phase.

The above-mentioned liquid-crystalline polyester has an inherently high strength. It has a small coefficient of linear expansion and a small molding shrinkage; therefore, it provides dimensionally accurate molded articles. It has a low melt viscosity and good flowability, and yet it withstands high temperatures of 180°–200° C. It is superior in chemical resistance, weatherability, and resistance to hot water. It is chemically inert and does not act on others.

The liquid-crystalline polyester used in the present invention has the above-mentioned composition. It should have an average molecular weight of 2,000–200,000. With lower than 2,000, the polyester does not have a satisfactory mechanical strength; and with higher than 200,000, the polyester needs an extremely high molding temperature and does not have good flowability required for accurate transfer of mold dimensions and configuration in the injection molding process. The particularly preferred average molecular weight is 10,000–80,000. According to the present invention, the liquid-crystalline polyester having a molecular weight in the specified range is incorporated with the above-mentioned specific fibrous material.

In addition, the liquid-crystalline polyester of the present invention may be blended with any other thermoplastic resin within limits not deleterious to the object of the invention.

The thermoplastic resin that can be blended includes polyolefins such as polyethylene and polypropylene; aromatic polyester such as polyethylene terephthalate and polybutylene terephthalate (composed of aromatic dicarboxylic acid and diol or hydroxy carboxylic acid); polyacetal (homo- or copolymer), polystyrene, polyvinyl chloride, polyamide, polycarbonate, ABS, polyoxyphenylene oxide, polyoxyphenylene sulfide, and fluoroplastic. These thermoplastic resins may be used in combination with one another.

BRIEF DESCRIPTION OF THE DRAWINGS

FIG. 1 is a graph showing the relationship between the molding shrinkage and the weight average fiber length of the fibrous material used in the present invention.

The fibrous material having a tensile modulus greater than 6,000 kg/mm$^2$ means comparatively rigid fiber. With a fibrous material having a tensile modulus lower than this value does not produce the effect of the present invention. In general, there is a tendency that ordinary plastics incorporated with a fibrous material are highly oriented as the result of flow in the molding process. This tendency is remarkable in the case where the fibrous material is stiff. Contrary to this known tendency, the present inventors unexpectedly found that the stiffer the fibrous material, the less the degree of orientation in the case of liquid-crystalline polyester. In other words, when the liquid-crystalline polyester is incorporated with a stiff fibrous material, the resulting composition has a small molding shrinkage in all the directions. A flexible fibrous material does not produce this effect, and the molding shrinkage of a composition incorporated with a flexible fibrous material is not so different from that of a liquid-crystalline polyester itself. This result leads one to consider that a stiff fiber is more effective than a flexible one in disturbing the molecular orientation of the liquid-crystalline polyester to some extent.

The fibrous material used in the present invention should have a weight average length of 0.15–0.60 mm in the composition. This requirement may be easily met if the weight average length of the fibrous material prior to mixing is established and the mixing condition is established by the preliminary test.

FIG. 1 is a graph showing the relationship between the molding shrinkage and the weight average length of the fibrous material incorporated into the composition. The molding shrinkage was measured on a square test piece measuring 120×120×3 mm, injection-molded through a 2-mm film gate. Pellets for injection molding were prepared by mixing, using an extruder, 70 parts by weight of liquid crystalline polyester and 30 parts by weight of glass fiber having a tensile modulus of 7,400 kg/mm$^2$ and a diameter of 10 μm. (The weight average length measured before mixing was 4.6 mm.) Injection molding was carried out under the following conditions. Cylinder temperature: 270°–290° C., mold temperature: 120°–130° C., injection pressure: 600 kg/cm$^2$, and injection speed: 0.6 m/min. The molding shrinkage was measured in directions parallel to and perpendicular to the direction of flow. According to the invention, the molding shrinkage under the above-mentioned condition is 0.5% at maximum. Incidentally, in the case where the liquid-crystalline polyester is not incorporated with the fibrous material, the molding shrinkage is −0.3% in the flow direction and 0.9% in the direction perpendicular to the flow direction. This phenomenon is common with liquid-crystalline polyesters and is not found in other resins. The minimum molding shrinkage is achieved when the weight average length of fiber is 0.15–0.60, preferably 0.2–0.4 mm. The difference between molding shrinkages in two directions is also minimal when the weight average length of fiber is in the above-mentioned range. These conditions are most important for the precision molding.

The performance achieved by the fibrous material varies depending on the kind and amount of the fibrous material used and other conditions; but the results are almost the same so long as the requirements specified in the invention are met.

According to the present invention, the fibrous material should have an aspect ratio greater than 10 and this fibrous material should be incorporated in an amount of 20–60 wt%, preferably 25–50 wt%, based on the total weight of the composition. With less than 20 wt%, no effect is produced; and with more than 60 wt%, the desired effect of the present invention is not produced because the molded article is highly anisotropic on account of the orientation of the fibrous material and there is a big difference between the molding shrinkages depending on directions.

The fibrous material should have an aspect ratio greater than 10, preferably 15–80. With an aspect ratio smaller than 10, the fibrous material merely produces almost the same effect as that of powdery or granular material. The composition incorporated with such a fibrous material is less anisotropic but has as high a molding shrinkage as that containing no fibrous material and hence has a low mechanical strength.

The fibrous material used in the present invention may be of any substance so long as it meets the requirements specified in the present invention. Preferred examples include glass fiber and carbon fiber.

The fibrous material used in the present invention may be used in combination with any known surface treating agent and collecting agent so as to increase adhesion to the liquid-crystalline polyester. They are functional compounds such as epoxy compound, isocyanate compound, silane compound, and titanate compound. These compounds may previously be applied to the fibrous material for surface treatment or collecting or added to the liquid-crystalline polyester at the time of compounding.

The composition of the present invention may be incorporated with well-known substances which are commonly added to thermoplastic resins and thermosetting resins. They are a plasticizer, anti-oxidant, UV light stabilizer, anti-static agent, flame retardant, dye and pigment, lubricant (to improve flowability and releasability), and nucleating agent. They are used according to the performance required.

[Effect of the invention]

As mentioned above, only when the liquid-crystalline polyester is incorporated with a specific fibrous material, the resulting composition has a low anisotropism in molding shrinkage and a low absolute value of molding shrinkage. This effect is not produced when a powdery or granular material is used instead of said fibrous material.

In other words, the composition of the present invention causes only a small molding shrinkage in any part and in any direction of injection molded items. Therefore, it permits precision molding and provides dimensionally accurate molded items. The small molding shrinkage simplifies the mold design.

The above-mentioned improvement is achieved without any adverse effect on the liquid-crystalline polyester's features such as high mechanical strength, high flowability, high melting point, and high heat resistance.

The composition of the present invention provides molded items having a coefficient of linear expansion similar to that of aluminum. Therefore, it is suitable for making injection-molded items to be used in combination with aluminum parts. Examples of such parts include camera parts, pickup of laser disc and compact disc players, and carriage arm and lead screw of floppy disc drive. Thus the composition of the present invention is suitable for the production of functional parts that require high accuracy.

To further illustrate the invention, and not by way of limitation, the following examples are given.

EXAMPLES 1 TO 5

70 parts by weight of each of liquid-crystalline polyesters A to E (mentioned later) was mixed with 30 parts by weight of glass fiber having a tensile modulus of 7,400 kg/mm$^2$ and a diameter of 10 μm (and a weight average fiber length of 4.6 mm measured before mixing). After intimate mixing, the mixture was pelletized by using an extruder. The pellets were heated to pyrolyze the resin and the remaining glass fiber was examined for weight average fiber length. The composition was made into a test piece measuring 120×120×3 mm by injection molding through a 2-mm film gate and the molding shrinkage of the test piece was measured. The conditions of injection molding were as follows: Cylinder temperature: 270°–290° C., mold temperature: 120°–130° C., injection pressure: 600 kg/cm$^2$, and injection speed: 0.6 m/min. Table 1 shows the molding shrinkage of the test pieces and the coefficient of linear expansion. The tensile strength of the test piece was 1400°–2700 kg/cm$^2$.

EXAMPLES 6 TO 10

70 parts by weight of each of liquid-crystalline polyesters A to E was mixed with 30 parts by weight of carbon fiber having a tensile modulus of 2,400,000 kg/mm$^2$ and a diameter of 7 μm (and a weight average fiber length of 6 mm measured before mixing). The resulting composition was made into test pieces by injection molding in the same manner as in Example 1. The results of evaluation are shown in Table 1.

TABLE 1

| Example No. | Resin designation | Weight average fiber length (mm) | Molding shrinkage (%) | | Coefficient of linear expansion (cm/cm/°C. × 10$^5$) | |
|---|---|---|---|---|---|---|
| | | | Parallel to flow | Perpendicular to flow | Parallel to flow | Perpendicular to flow |
| 1 | Resin A | 0.33 | 0.04 | 0.39 | 1.12 | 2.50 |
| 2 | Resin B | 0.31 | 0.03 | 0.38 | 1.13 | 2.46 |
| 3 | Resin C | 0.30 | 0.02 | 0.38 | 1.19 | 2.39 |
| 4 | Resin D | 0.32 | 0.02 | 0.38 | 1.16 | 2.42 |
| 5 | Resin E | 0.32 | 0.013 | 0.19 | 1.18 | 2.38 |
| 6 | Resin A | 0.40 | 0 | 0.22 | 0.20 | 0.80 |
| 7 | Resin B | 0.41 | −0.01 | 0.21 | 0.19 | 0.78 |
| 8 | Resin C | 0.40 | 0 | 0.22 | 0.21 | 0.81 |
| 9 | Resin D | 0.43 | −0.02 | 0.22 | 0.20 | 0.83 |
| 10 | Resin E | 0.42 | 0 | 0.19 | 0.43 | 1.02 |

COMPARATIVE EXAMPLE 1

The same procedure as in Example 1 was repeated except that the amount of glass fiber was changed to 30 parts by weight. The weight average fiber length of glass fiber in the composition was 0.9 mm. The molding shrinkage was 0.13% and 1.10%, respectively, in the directions parallel to flow and perpendicular to flow.

EXAMPLE 11

The same procedure as in Example 1 was repeated except that the amount of glass fiber was changed to 40 parts by weight. The molding shrinkage was 0.04% and 0.45%, respectively, in the directions parallel to flow and perpendicular to flow. The weight average fiber length of glass fiber in the composition was 0.25 mm.

EXAMPLE 12

The same procedure as in Example 1 was repeated except that the amount of glass fiber was changed to 20 parts by weight. The molding shrinkage was 0.03% and 0.48%, respectively, in the directions parallel to flow and perpendicular to flow. The weight average fiber length of glass fiber in the composition was 0.40 mm.

EXAMPLE 13

The same procedure as in Example 1 was repeated except that the glass fiber was replaced by one which has a weight average fiber length of 6.6 mm measured before mixing. The molding shrinkage was 0.07% and 0.45%, respectively, in the direction parallel to flow and perpendicular to flow. The weight average fiber length of glass fiber in the composition was 0.50 mm.

EXAMPLE 14

The same procedure as in Example 1 was repeated except that the glass fiber was replaced by one which has a weight average fiber length of 4.0 mm measured before mixing. The molding shrinkage was 0.1% and 0.45%, respectively, in the directions parallel to flow and perpendicular to the flow. The weight average fiber length of glass fiber in the composition was 0.2 mm.

COMPARATIVE EXAMPLES 2 TO 8

The same procedure as in Example 1 was repeated except that the glass fiber was replaced by various kinds of additives as shown in Table 2. The molding shrinkage of the resulting compounds was measured.

TABLE 2

| Comparative Example No. | Additive Kind | Weight (%) | Molding shrinkage, % Parallel to flow | Perpendicular to flow | Tensile strength (kg/cm$^2$) |
|---|---|---|---|---|---|
| 2 | Silica (4–5 μm) | 30 | −0.042 | 0.0775 | 1580 |
| 3 | Silica (4–5 μm) | 50 | 0.129 | 0.612 | 930 |
| 4 | Milled fiber (13 μm × 0.1 mm) | 30 | −0.043 | 0.822 | 2030 |
| 5 | Milled fiber (13 μm × 0.1 mm) | 50 | 0.133 | 0.570 | 1560 |
| 6 | Glass beads (18–20 μm dia.) | 30 | 0.268 | 0.888 | 660 |
| 7 | Glass beads (18–20 μm dia.) | 50 | 0.381 | 0.749 | 460 |
| 8 | none | — | −0.231 | 0.816 | 1700 |

COMPARATIVE EXAMPLE 9

The same procedure as in Example 1 was repeated except that Resin A was replaced by polybutylene terephthalate and glass fiber or glass bead was incorporated as shown in Table 3. The molding shrinkage was measured. The weight average fiber length of glass fiber in the composition was 0.32 mm.

TABLE 3

| Additive Kind | Weight (%) | Molding shrinkage (%) Parallel to flow | Perpendicular to flow |
|---|---|---|---|
| none | — | 1.5 | 1.5 |
| Glass fiber | 30 | 0.3 | 0.8 |
| Glass bead | 30 | 1.5 | 1.3 |

TABLE 3-continued

| Additive Kind | Weight (%) | Molding shrinkage (%) Parallel to flow | Perpendicular to flow |
|---|---|---|---|
| (18–20 μm dia.) | | | |

In the case of moldings of polybutylene resin alone (without additive), the molding shrinkage is the same in two directions. The molding shrinkage becomes anisotropic when glass fiber or glass bead is incorporated. This phenomenon is reversed in the case of liquid-crystalline polyester composition. That is, the incorporation of additive reduces the anisotropism of molding shrinkage.

COMPARATIVE EXAMPLE 10

The same procedure as in Example 1 was repeated except that Resin A was replaced by polyoxymethylene and glass fiber, glass bead, or milled fiber was incorporated as shown in Table 4. The molding shrinkage was measured. The weight average fiber length of glass fiber in the composition was 0.32 mm.

TABLE 4

| Additive Kind | Weight (%) | Molding shrinkage (%) Parallel to flow | Perpendicular to flow |
|---|---|---|---|
| none | — | 1.9 | 1.7 |
| Glass fiber | 30 | 0.6 | 1.3 |
| Glass bead (18–20 μm dia.) | 30 | 1.3 | 1.1 |
| Milled fiber (13 μm, 0.1 mm) | 30 | 1.1 | 0.7 |

As in Comparative Example 1, polyoxymethylene has almost the same molding shrinkage in the two directions; however, the anisotropism in molding shrinkage increases when glass fiber or milled fiber is incorporated.

Incidentally, the resins A to E used in the examples have the following constituents.

A:
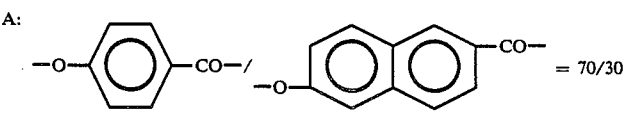
= 70/30

B:
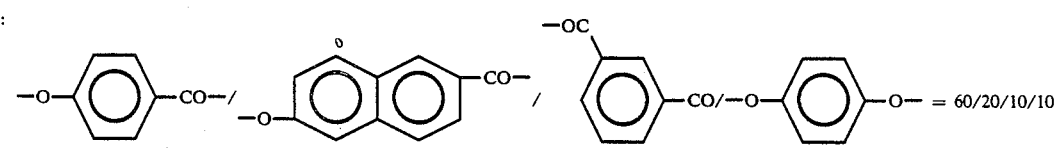
= 60/20/10/10

C: 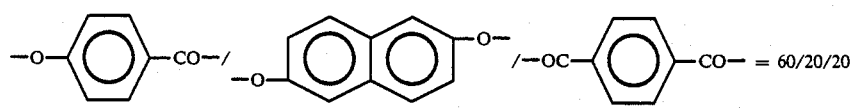 = 60/20/20

D: 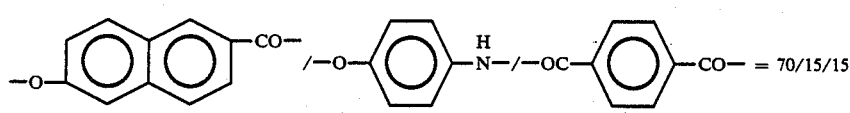 = 70/15/15

E: 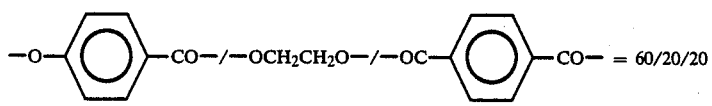 = 60/20/20

(The figures are in terms of molar ratio).

What is claimed is:

1. A resin composition which comprises 40 to 80 percent by weight of a thermotropic, liquid crystalline polyester being capable of forming an anisotropic phase in the molten state and having a weight-average molecular weight of 2,000 to 20,000 and 20 to 60 percent by weight of a fibrous material having a tensile modulus of not less than 6,000 kg/mm$^2$, a weight-average length of 0.15 to 0.60 mm and an aspect ratio of not less than 10.

2. The resin composition as claimed in claim 1, in which the fibrous material has a diameter of 5 to 15 microns and a weight-average length of 0.2 to 0.4 mm.

3. The resin composition as claimed in claim 1, in which the fibrous material is a glass fiber or carbon fiber.

4. The resin composition as claimed in claim 1, which comprises 50 to 75 wt.% of the polyester and 25 to 50 wt.% of the fibrous material.

5. The resin composition as claimed in claim 1, in which the polyester has a weight-average molecular weight of 10,000 to 80,000.

6. The resin composition as claimed in claim 1, in which the polyester is an aromatic polyester.

* * * * *